Apr. 3, 1923.
J. T. BARBER
1,450,199
LATCH DEVICE FOR SKID CHAINS AND THE LIKE
Filed Mar. 22, 1922
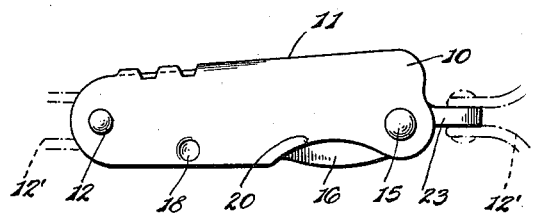
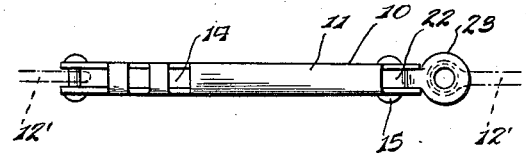
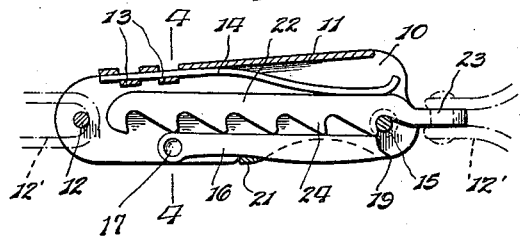
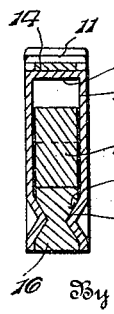
Inventor
J. T. Barber.
By
Lloyd Casey, Attorney Patented Apr. 3, 1923.

1,450,199

UNITED STATES PATENT OFFICE.

JAMES T. BARBER, OF BROOKLYN, NEW YORK.

LATCH DEVICE FOR SKID CHAINS AND THE LIKE.

Application filed March 22, 1922. Serial No. 545,738.

*To all whom it may concern:*

Be it known that I, JAMES T. BARBER, a citizen of the United States, residing at Brooklyn, in the county of Kings and State of New York, have invented certain new and useful Improvements in Latch Devices for Skid Chains and the like, of which the following is a specification.

This invention relates to certain new and useful improvements in a latch device or link for fastening non-skid chains, ropes, bands, etc., to automobiles, motorcycles, tractors, and other vehicles using such traction accessories.

One of the objects of the invention is to provide a compact and efficient device of suitable appearance and size which will facilitate the positive fastening of non-skid chains and accesssories with less effort and time as compared with similar fastenings now on the market.

Another object is to provide a sufficient range of adjustment within certain limits to permit of fastening said accessories tightly in place so as to avoid the excessive noise usually attending loose chains and especially to obtain reliable traction.

A further object is to facilitate the rapid and convenient removal of these accessories which, under ordinary circumstances, are usually in a muddy and repellant condition.

And the invention has as a still further object to provide a device wherein accidental disengagement or release of the device will be prevented.

Other and incidental objects will appear hereinafter.

In the drawings:

Figure 1 is a side elevation of my improved device,

Figure 2 is a top plan view of the device,

Figure 3 is a vertical sectional view taken medially through the device, and

Figure 4 is a sectional view on the line 4—4 of Figure 3.

In carrying the invention into effect, I employ a channel shaped case or body member 10 which is preferably formed from a piece of suitable resilient sheet metal and comprises spaced parallel sides joined by a transverse connecting portion 11. As best shown in Figures 1 and 3 of the drawing, the body member is gradually tapered longitudinally while the connecting portion 11 is somewhat shorter than the sides of the member. Extending through the sides of the member at the small end thereof is a rivet or other suitable fastening device 12 connecting the device with one end of a chain, as conventionally illustrated at 12′ and pressed inwardly from the connecting portion 11 of the member at the adjacent end thereof are straps 13. Tightly held at one end between these straps and said connecting portion is a spring 14 which is freely received between the sides of the member and is bowed downwardly toward its forward end, the forward end of the spring projecting beyond the forward end of the connecting portion 11 but terminating short of the forward ends of the sides of the member. Extending transversely between said sides at the forward end of the body member is a headed cross pin 15 disposed adjacent the lower edges of the sides rigidly supporting said sides against separation and pivoted between the sides at their lower margins is a trip member 16. Formed in the sides faces of this trip member at its rear end are sockets 17, and pressed inwardly from the sides of the member 10 are bosses 18 engaging in said sockets for pivotally supporting the trip member. At its forward end said member is provided with a lug 19 engageable with the cross pin 15 for limiting the member in its upward movement between the sides of the body member and, as best shown in Figure 1, the sides of the body member at the forward end portion of said member are provided with arcuate notches 20 exposing said trip member so that the trip member may be readily grasped by the thumb. Integrally formed on one of the sides of the body member is a stop lug 21 which, as shown in Figure 3, is bent laterally to extend transversely between the sides for supporting the trip member against downward movement, the trip member being thus held in position housed by the body member. Freely insertable in the body member is a latch 22 provided at its outer end with an eye 23 through which is engaged a rivet or other suitable fastening device, connecting the latch to the opposite end of the chain 12′. The forward or inner end of said latch is rounded to ride under the forward end of the spring 14 and, as will be observed, the forward end of the spring is bent upwardly so that the latch may be readily engaged therebeneath. The upper edge of the latch is smooth so that the spring may readily ride thereover and formed in said latch at its lower edge is a series of teeth 24 selectively engageable with the cross pin 15.

As will now be readily understood, the ends of the chain may be joined by inserting the latch 22 into the body member, as shown in Figure 3, when the spring 14 will act to press the latch downwardly to engage one of the teeth thereof with the cross pin 15, the series of teeth upon the latch providing a means whereby the latch may be adjustably positioned within the body member. As will be perceived, the spring will hold the latch against accidental disengagement from said pin. However, by pressing upwardly upon the free end of the trip member 16, the latch may be shifted upwardly between the sides of the body member to disengage the pin when the latch may then ride outwardly upon the forward end of said trip member from within the body member. Accordingly, the latch may be manually released with ease.

Having thus described the invention, what is claimed as new is:

1. A skid chain fastener including a channel shaped body member, a cross pin extending between the sides of said member, a latch adapted to fit between said sides engaging the pin, and a trip member pivoted between the sides and operable to ride the latch out of engagement with the pin.

2. A skid chain fastener including a channel shaped body member, a cross pin extending between the sides of said member, a latch adapted to fit between said sides engaging the pin, a trip member pivoted between the sides and operable to ride the latch out of engagement with the pin, and a spring carried by the body member to coact with the latch yieldably holding the latch engaged with the pin.

3. A fastener of the character described including a body member, a pin carried thereby, a latch coacting with the body member engaging said pin, and a trip member pivoted upon the body member and operable for riding the latch out of engagement with said pin.

4. A fastener of the character described including a body member having spaced sides, a cross pin extending between the sides of said member, a latch engaging said pin, and a pivoted trip member extending longitudinally of the body member between the sides thereof and having a portion of its length exposed for engagement to rock the trip member against the latch and ride the latch out of engagement with said pin.

5. A fastener of the character described including a channel shaped body member having bosses pressed from the sides thereof, a pin extending between the sides of said member, a latch fitting between said sides engaging the pin, and a trip member having sockets accommodating said bosses to pivotally support the trip member, the trip member being operable to ride the latch out of engagement with said pin.

In testimony whereof I affix my signature.

JAMES T. BARBER. [L. S.]